United States Patent
Liu

(10) Patent No.: US 11,438,391 B1
(45) Date of Patent: *Sep. 6, 2022

(54) USER CONFIGURABLE DATA STORAGE

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,392

(22) Filed: Dec. 21, 2020

Related U.S. Application Data

(63) Continuation of application No. 16/293,349, filed on Mar. 5, 2019, now Pat. No. 10,873,610, which is a continuation of application No. 15/645,607, filed on Jul. 10, 2017, now Pat. No. 10,230,773, which is a continuation of application No. 15/074,372, filed on Mar. 18, 2016, now Pat. No. 9,705,943, which is a (Continued)

(51) Int. Cl.
| | |
|---|---|
| *H04L 65/40* | (2022.01) |
| *H04L 65/1069* | (2022.01) |
| *H04L 65/1096* | (2022.01) |
| *H04M 3/00* | (2006.01) |
| *H04M 3/533* | (2006.01) |
| *H04L 67/1095* | (2022.01) |
| *H04L 9/40* | (2022.01) |

(52) U.S. Cl.
CPC .............. *H04L 65/40* (2013.01); *H04L 63/10* (2013.01); *H04L 65/1069* (2013.01); *H04L 65/1096* (2013.01); *H04L 67/1095* (2013.01); *H04M 3/00* (2013.01); *H04M 3/53333* (2013.01); *H04M 2201/36* (2013.01); *H04M 2242/40* (2013.01)

(58) Field of Classification Search
CPC . H04L 65/40; H04L 65/1069; H04L 65/1096; H04L 63/10; H04L 67/1095; H04M 3/00; H04M 3/53333; H04M 2201/36; H04M 2242/40

See application file for complete search history.

(56) References Cited

U.S. PATENT DOCUMENTS

| | | |
|---|---|---|
| 5,717,742 A | 2/1998 | Hyde-Thomson |
| 6,229,883 B1 | 5/2001 | Kakizaki et al. |

(Continued)

FOREIGN PATENT DOCUMENTS

WO 1996042041 A2 12/1996

*Primary Examiner* — Kevin D Mew
(74) *Attorney, Agent, or Firm* — Crawford Maunu PLLC

(57) ABSTRACT

In one or more examples, a method uses a system including data server, a processing circuit, and a data-communications server, with the server being used to route calls in the form of data communications to and from a plurality of telecommunication devices associated with respective user accounts. The server may store data generated by the plurality of telecommunication devices on the data server. The user accounts each have a settings file associated with the user account. In response to a set of criteria indicated in the settings file of one of the user accounts being satisfied, the processing circuit logs into a data server remote to the server may use login credentials included in the settings file. In further response to the set of criteria being satisfied, the processing circuit may copy one or more data files associated with the user account from the data server to the remote data server.

19 Claims, 4 Drawing Sheets

Related U.S. Application Data continuation of application No. 14/224,808, filed on Mar. 25, 2014, now Pat. No. 9,306,985.

(56) References Cited

U.S. PATENT DOCUMENTS

| | | | |
|---|---|---|---|
| 7,310,629 B1 | 12/2007 | Mendelson et al. | |
| 7,599,941 B2* | 10/2009 | Bahar | G06F 16/184 |
| 7,801,286 B1 | 9/2010 | Thentheruperai et al. | |
| 8,606,897 B2* | 12/2013 | Ferris | G06Q 10/00 |
| | | | 709/223 |
| 9,294,550 B2 | 3/2016 | Song et al. | |
| 9,306,985 B1 | 4/2016 | Liu | |
| 9,705,943 B1 | 7/2017 | Liu | |
| 10,805,427 B1* | 10/2020 | Eddings | H04L 67/1095 |
| 2002/0078174 A1* | 6/2002 | Sim | G06F 16/182 |
| | | | 709/219 |
| 2002/0184575 A1 | 12/2002 | Landan | |
| 2003/0014477 A1 | 1/2003 | Oppenheimer et al. | |
| 2004/0162781 A1 | 8/2004 | Searl et al. | |
| 2004/0181580 A1 | 9/2004 | Baranshamaje | |
| 2004/0249984 A1* | 12/2004 | Das | G06F 9/505 |
| | | | 709/249 |
| 2006/0129627 A1 | 6/2006 | Phillips et al. | |
| 2006/0259607 A1* | 11/2006 | O'Neal | H04L 67/104 |
| | | | 709/223 |
| 2007/0067351 A1* | 3/2007 | Singh | G06F 16/20 |
| 2008/0005318 A1 | 1/2008 | Dong et al. | |
| 2009/0144413 A1 | 6/2009 | Khan et al. | |
| 2009/0254610 A1* | 10/2009 | Arthursson | G06F 9/455 |
| | | | 709/203 |
| 2010/0071038 A1* | 3/2010 | Flynn | H04L 67/28 |
| | | | 726/5 |
| 2010/0188975 A1* | 7/2010 | Raleigh | H04L 67/145 |
| | | | 370/230.1 |
| 2011/0075828 A1 | 3/2011 | Okita et al. | |
| 2011/0137854 A1* | 6/2011 | Walter | H04L 67/104 |
| | | | 707/608 |
| 2011/0197279 A1 | 8/2011 | Ueoka | |
| 2011/0241981 A1* | 10/2011 | Sojian | G06F 13/102 |
| | | | 345/156 |
| 2012/0036019 A1* | 2/2012 | Broumand | G06Q 30/02 |
| | | | 705/14.66 |
| 2012/0084523 A1 | 4/2012 | Littlefield et al. | |
| 2014/0123225 A1 | 5/2014 | Hopen et al. | |
| 2015/0201036 A1* | 7/2015 | Nishiki | H04L 67/1095 |
| | | | 709/224 |
| 2015/0215241 A1 | 7/2015 | Zhou | |
| 2019/0087277 A1* | 3/2019 | Kore | G06F 16/183 |

* cited by examiner

USER CONFIGURABLE DATA STORAGE

FIELD OF THE INVENTION

The present disclosure relates to computing servers and data storage.

OVERVIEW

Computing servers are increasingly being used to provide various services over a network including but not limited to website hosting, remote data storage, remote computing services, virtual computing environments, and communication services (e.g., voice-over-IP (VoIP), video conferencing, call exchange servers, packet switching, and traffic management). For ease of reference, the various applications, systems and services that may be provided by computing servers may be collectively referred to as remote services.

SUMMARY

Aspects of the present disclosure are directed to network applications that address challenges including those discussed above, and are applicable to a variety of applications, devices, systems, and methods. These and other aspects of the present disclosure are exemplified in a number of implementations and applications, some of which are shown in the figures and characterized in the claims section that follows.

In accordance with one or more embodiments, a method uses a data server, a data-communications (e.g., VoIP) server, and a processing circuit. The server routes calls to and from a plurality of telecommunication devices associated with respective user accounts. The server stores data generated by the plurality of telecommunication devices on the data server. The user accounts may each have a settings file associated with the user account. In response to a set of criteria indicated in the settings file of one of the user accounts being satisfied, the processing circuit logs into a second data server that is remote to the server using login credentials included in the settings file. In further response to the set of criteria being satisfied, the processing circuit copies one or more data files associated with the user account from the data server to the remote data server.

Using a computing server, an overall communications system may be used to provide one or more remote services are provided to a user associated with a user account. Data generated by the user of the one or more remote services may be stored on a data server. A set of criteria is indicated in a settings file associated with the user account. In response to the set of criteria being satisfied, a data server remote to the computing server is logged into using login credentials included in the settings file. One or more data files are copied from the data server to the remote data server.

In accordance with one or more embodiments, an apparatus is also disclosed that includes a first data server, a computing server, and a processing circuit. The computing server provides one or more remote services to a user. In response to the user of the one or more remote services generating data, the processing circuit selects one of a set of data servers for storage of the data based on a set of criteria indicated in a settings file associated with the user. The set of data servers includes the first data server and also a second data server that is remote to the computing server.

BRIEF DESCRIPTION OF THE DRAWINGS

The invention may be more completely understood in consideration of the following detailed description of various embodiments of the invention in connection with the accompanying drawings, in which.

Figure 1:
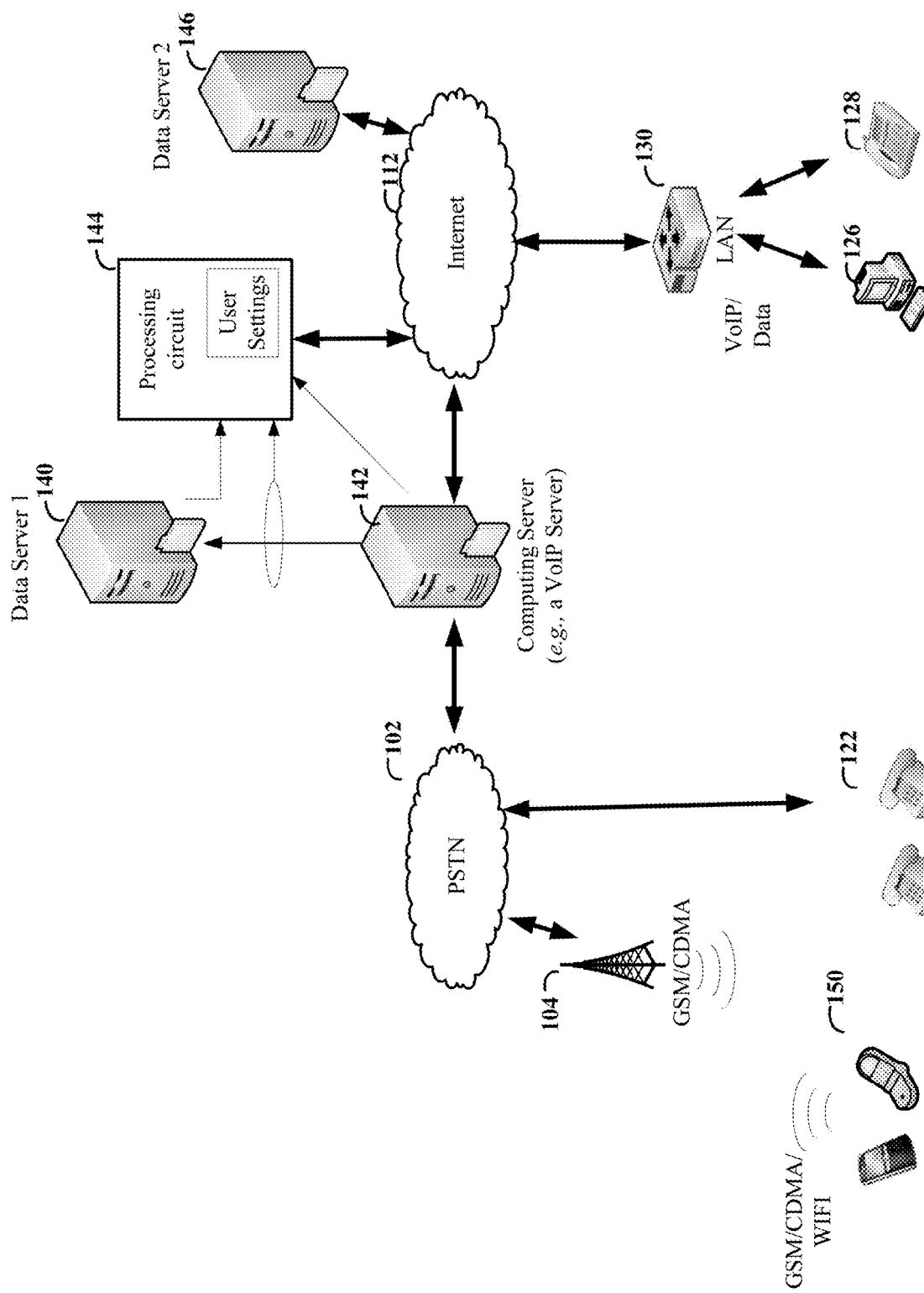
FIG. 1 shows an example communication network with a processing circuit configured to backup voice messages of a VoIP server to a remote data server.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various methods, circuits, and apparatus for storing and backing up data generated in a computing server.

In one or more embodiments, an apparatus includes a computing server configured to provide one or more remote services to users associated with one or more user accounts. The apparatus also includes a first data server that may be used to store data generated by users of the computing server. The apparatus also includes a processing circuit configured to store user data to a second data server, remote to the computing server, in response to a set of criteria being satisfied. For instance, in some implementations, each user account includes a respective set of criteria stored in a respective settings file associated with the user account. In response to the set of criteria indicated in the settings file of one of the user accounts being satisfied, the processing circuit logs into the second data server using login credentials included in the settings file. After logging into the second data server, the processing circuit may store one or more data files associated with the user account in the second data server.

For ease of reference, a data server included in the apparatus or connected thereto via a local-area-network (e.g., the first data server) may be referred to as a local data server. Likewise, a data server remote to the apparatus (e.g., connected to the apparatus via the internet or other wide-area network) may be referred to as a remote data server.

In some embodiments, the user data is initially stored by the computing server in the local data server included in the apparatus. In response to the set of criteria indicated in the settings file of one of the user accounts being satisfied, the processing circuit logs into the remote data server and stores one or more data files associated with the user account in the remote data server. In some implementations, the processing circuit may be configured to remove the one or more data files after they have been copied to the remote data server.

In some embodiments, in response to the user of the one or more remote services generating data, the processing circuit selects one of the available data servers for storage of the data, based on a set of criteria indicated in a settings file. In some implementations, the processing circuit may direct the computing server to store the generated data in the selected data server. In some other implementations, the processing circuit receives the generated user data from the computing server and forwards the user data to the selected data server.

Different embodiments may utilize various criteria to determine when to store/backup user data on a remote data server. For instance, in some embodiments, the set of criteria may direct the processing circuit to backup/store all user data files on the remote data server or backup/store only a subset of the user data files on the remote data server. Data files may be selected to be backed-up/stored on the remote data server based on various characteristics including, but not limited to, file type, file size, date of creation, and/or available storage. For instance, in some implementations, the set of criteria prompts the processing circuit to move files to the remote data server in response to a total amount of data stored on the data server for a user account exceeding a threshold data size. In some embodiments, the set of criteria prompts the processing circuit to move files to the remote data server in response to an amount of user allocated memory in the local data server falling below a threshold amount.

In some embodiments, the processing circuit is configured to maintain a first index of data files stored on the local data server and a second index of data files stored on the remote data server. In response to a first user command, the processing circuit provides or displays a list of data files in the first and second indexes that are associated with the user account. From a user perspective, data may be stored and retrieved as though all of the user generated data was stored on a single data server.

In some implementations, the processing circuit is configured to provide a web-based graphical user interface (GUI) for an authorized user to review/adjust the set of criteria and/or other settings of a user account. In some embodiments, the GUI may allow users to generate reports indicating various usage statistics for the local and remote data servers.

The disclosed embodiments are applicable to various different types of computing servers including, e.g., VoIP servers, file servers, email servers, web servers, and/or virtual computing services. For ease of explanation, the examples and embodiments herein may be primarily described with reference to VoIP servers. While the disclosed embodiments are not necessarily limited to such applications, various aspects of the present disclosure may be appreciated through a discussion of various examples using this context.

In some embodiments, an apparatus includes a VoIP server configured to provide VoIP services to users associated with respective user accounts. The apparatus also includes a local data server that may be used to store data generated by users of the VoIP server. The apparatus also includes a processing circuit configured to store user data to a second data server, remote to the computing server, in response to a set of criteria being satisfied. In response to the set of criteria being satisfied, the processing circuit logs into the remote data server, using login credentials included in a settings file, and stores one or more data files associated with the user account in the remote data server. Different embodiments may utilize various criteria to direct the processing circuit to backup/store user data files on the remote data server including, but not limited to, file type, file size, date of creation, and/or available storage.

In some embodiments, in response to an unanswered VoIP call to a user, the VoIP server provides an interface for a caller to leave a voice message for the user. In some implementations, the set of criteria directs the processing circuit to store the voice message on the remote data server. In some embodiments, the set of criteria further directs the processing circuit to remove the voice message from the local data server.

In some embodiments, the VoIP server is configured to record a VoIP call in response to a first user command. In some embodiments, the VoIP server is configured to record a VoIP call in response to the VoIP call being initiated from a telephone number associated with one of the user accounts (e.g., to assure quality of service in a call center). In some embodiments, the set of criteria directs the processing circuit to move data from the local data server to the remote data server in response to a total amount of voice data for a user account exceeding a threshold specified by the set of criteria.

In some embodiments, the VoIP server is configured to transcribe a recorded VoIP call in response to a second user command. In some implementations, the set of criteria directs the processing circuit to store the transcription on the remote data server.

Turning now to the figures, FIG. 1 shows a telecommunication network including a computing server 142 configured to provide one or more remote services (e.g., VoIP services, email services, and/or online data storage) to various end-point devices including, e.g., mobile devices 150, plain-old telephones (POTS) 122, computer(s) 126, and/or IP phones 128. The computing servers may provide a variety of different remote services. Data transactions related to the remote services are communicated between the computing server 142 and the remote users over various data networks including, e.g., the internet 112, public service telephone networks 102, cellular networks 104, and wired or wireless private data networks (e.g., LAN 130, and/or Private Branch Exchange servers (not shown)).

In some embodiments, the computing server 142 is configured to store data generated by a user of the remote services in a data server 140. In some implementations, the data transferred to and from the data server 140 are monitored by a processing circuit 144, which is communicatively-coupled thereto. The communicative-coupling of the computing server 142 and processing circuit 144 may include either a direct connection or an indirect connection having, e.g., multiple connections, relay nodes, and/or networks in a communication path between the computing server 142 and processing circuit 144.

The processing circuit 144 is configured to selectively backup user data from the first data server 140 to a second data server 146 according to a set of criteria indicated in a user settings file. The second data server 146 may be, for example, a remote data server communicatively connected to the processing circuit via the internet 112. In response to the criteria indicating that one or more files should be backed up, the processing circuit logs into the second data server 146 using login information indicated in the user settings and stores a copy of the one or more files in the second data server 146. In some implementations, the backed data files may be removed from the first data server 140 after the files have been copied to the second data server 146.

In some embodiments, the processing circuit 144 is configured to direct the computing server 142 to store generated user data in one of the available data servers (140 and 146) that is selected based on the set of criteria indicated in the user settings. In response to user data being generated by the computing server 142, the processing circuit 144 selects one of the available data servers (140 and 146) according to the set of criteria and directs the computing server to store the generated user data in the selected data server.

Different embodiments may utilize various criteria to determine when to store/backup user data on a remote data server. For instance, in some embodiments, the set of criteria may direct the processing circuit to backup/store all user data files on the second data server 146 or backup/store only a subset of the user data files on the second data server 146. Files may be selected to be backed-up/stored on the second data server 146 based on various characteristics including, but not limited to, file type, file size, date of creation, and/or available storage.

In some embodiments, the set of criteria may be individually adjusted for each user of the computing server 142. In some implementations, the processing circuit is configured to provide a web-based GUI for an authorized user to review/adjust the set of criteria and/or other settings of a user account. In some embodiments, the GUI may allow an authorized manager of a user account to adjust sets of criteria for a group of users. For instance, the GUI may allow a manager to adjust the criteria used for all users associated with a client account (e.g., a company account) or for particular devices or users authorized to use the computing server 142 via the client account. In some embodiments, reports may be generated that indicate various usage statistics for the local and remote data servers. The reports may be generated account-wide or for specific devices and/or users.

In some embodiments, the processing circuit may be configured to provide an alert to a user if certain criteria are met (e.g., available storage below a user defined threshold). Alerts may be provided to a user or account manager using a number of different types of messages including, e.g., SMS text messages, emails, voice recordings, instant messengers, and or social network messaging services. In one or more implementations, the alert message that is sent to an authorized user is configured to provide a mechanism for a user to select from one or more possible actions. For instance, in one implementation, an email or SMS text message may include a web address link to a webpage from which a user may select an action to take. In another implementation, a user may select a desired action by responding to an SMS text message with a text message indicating the selected action.

For ease of explanation, the examples are primarily described with reference to backup of user data to a single remote data server. However, the embodiments are not so limited. For instance, in some embodiments, a processing circuit may backup user data using multiple remote data servers. For instance, a user may adjust user settings to backup data in several free or paid cloud-based file servers (e.g., DROPBOX, GOOGLE DRIVE, and/or AMAZON CLOUD). The processing circuit may select which remote server to use for a particular backup operation based on a number of factors that may be specified in the set of criteria (e.g., available user storage on the remote data servers, threshold storage for the remote data servers specified in the set of criteria, transfer speeds to the remote data servers, and/or monetary cost for backup to the remote data servers).

Figure 2:
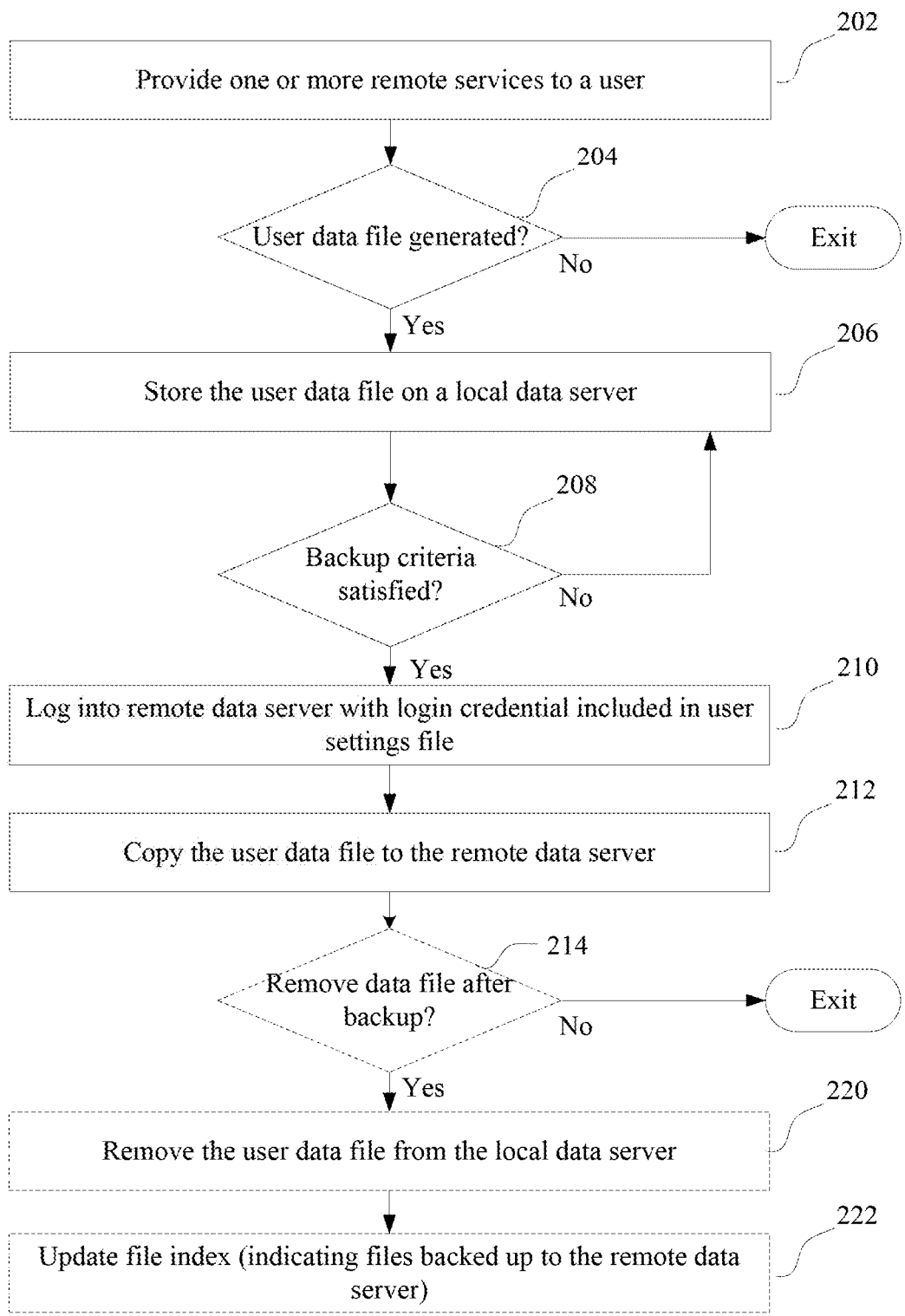
FIG. 2 shows an example process for backing-up data generated by a user of a remote service to a remote data server.

FIG. 2 shows an example process for backing-up data generated by a user of a remote service to a remote data server. One or more remote services are provided to a user at block 202. If a user data file is generated, decision block 204 directs the process to store the user data file on a local data server at block 206. Otherwise, at block 206, the user data is stored on a data server local to the computing server that provides the remote services to the user. If the set of criteria is not satisfied at decision block 208, the process exits. Otherwise, the process logs into a remote data server at block 210 using login credentials (e.g., included in a user settings file). At block 212, the process copies the user data file to the remote data server.

In some implementations, the process may optionally remove the data file from the local data server if so directed by the user settings. If user settings indicate that files are to be removed after backup, decision block 214 directs the process to remove the user data file from the local data server at block 220.

Optionally, in some embodiments, the process may update an index file that indicates files that are backed up to the remote server. The update to the index file may be performed at block 222, as shown in FIG. 2, or may be performed at some other point after the set of criteria is satisfied at decision block 208.

Figure 3:
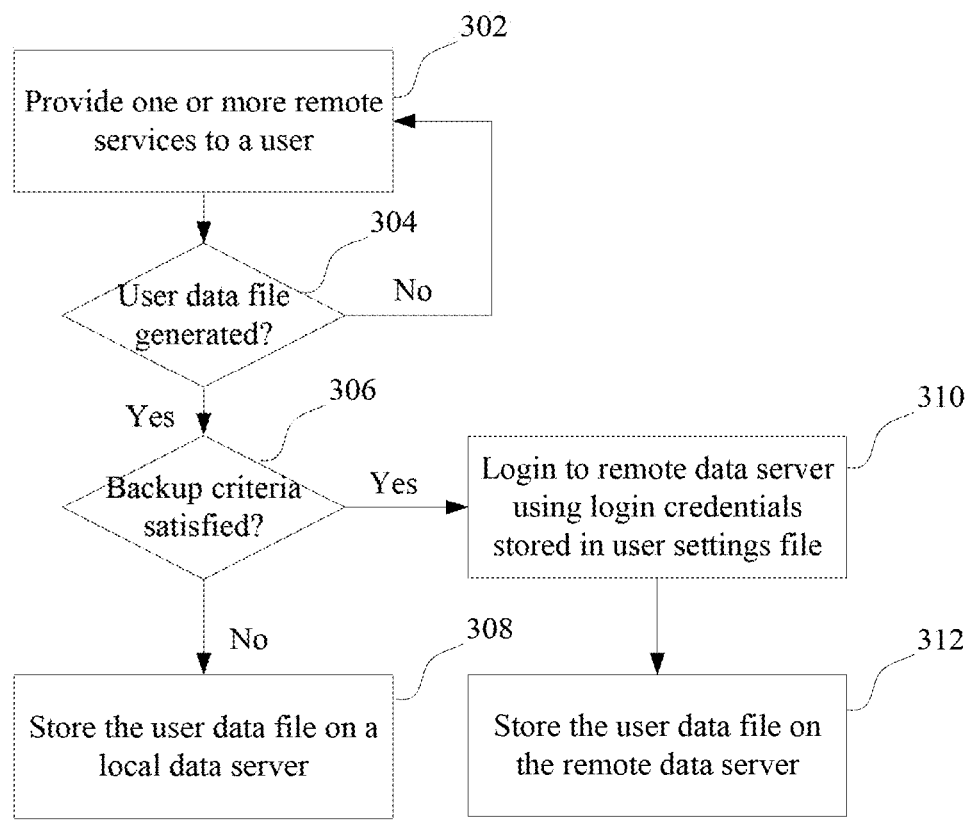
FIG. 3 shows an example process for storing data generated by a user of a remote service to a remote data server.

FIG. 3 shows an example process for storing data generated by a user of a remote service using a remote data server. In this example, user data may be stored on a remote data server without first storing the user data on a local data server. One or more remote services are provided to a user at block 302. If a user data file is generated, decision block 304 directs the process to decision block 306. If the set of criteria is not satisfied at decision block 306, the user data file is stored on the local data server 308. Otherwise, if the set of criteria is satisfied at decision block 306, the process logs into the remote data server at block 310 using login credentials stored in a user setting file. At block 312, the user data file is stored on the remote data server.

As indicated above, the disclosed embodiments are applicable to computing servers providing various remote services, including, e.g., VoIP services, data storage, email services, web services, and/or virtual computing services.

Figure 4:
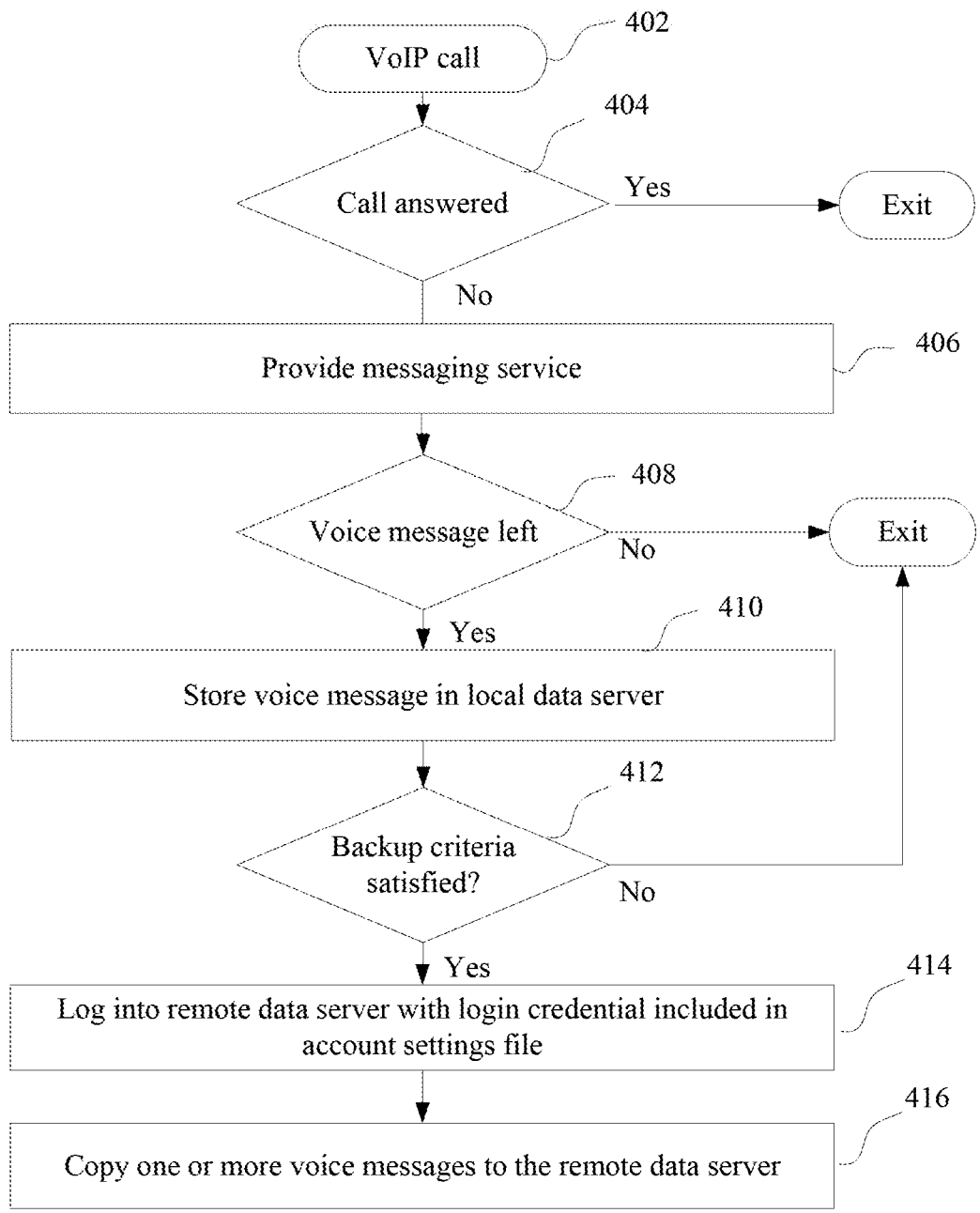
FIG. 4 shows an example process for backing up voice messages to a remote data server.

FIG. 4 shows an example process for backing up voice messages generated by a user of a VoIP server. If an incoming VoIP call 402 is answered at decision block 404, the process exits. Otherwise, if the VoIP call is not answered, a messaging service is provided at block 406. If no voice message is left, decision block 408 directs the process to exit. Otherwise, if a message is left, the voice message is stored in a local data server at block 410.

If the set of criteria indicated in a user settings file for the user is not satisfied, decision block 412 directs the process to exit. Otherwise, if the set of criteria is satisfied at decision block 412, the process logs into a remote data server at block 414 using logic credential included in the user settings file for the user. One or more voice messages are copied from the local data server to the remote data server at block 416. In some embodiments, a user may adjust the user settings to determine whether or not files are to be removed from the local data server after backup is complete.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a data server, a VoIP server, or a processing circuit). For example, in certain of the above-discussed embodiments, one or more modules are discrete logic circuits or programmable logic circuits configured and arranged for implementing these operations/activities, as in the blocks shown in FIGS. 2-4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. It is intended that the specification and illustrated embodiments be considered as examples only, with a true scope of the invention being indicated by the following claims.

What is claimed is:

1. A method, comprising:
   using a first data server to store data generated by a plurality of data communication devices, each data communication device including data communication circuitry and being associated with a respective user account among a plurality of user accounts associated with a communications server provides one or more remote services to the plurality of data communication devices on behalf of the plurality of user accounts and as indicated in a settings file corresponding to the respective user account; and
   a processing circuit receiving and responding to a set of criteria being satisfied and being indicated in the respective settings file, by recognizing a specific type of communication received on behalf of the respective user account and by:
      logging into a second data server remote to the communications server using login credentials included in the respective settings file; and
      copying data corresponding to one or more data files associated with the user account from the first data server to the second data server; and
   wherein the processing circuit, via a graphic user interface (GUI), is used by an authorized manager of the respective user account to cause adjustment of sets of criteria for a group of users receiving the remote services from the communications server on behalf of the respective user account.

2. The method of claim 1, wherein the respective settings file for each respective user account includes a set of criteria being individually adjusted for at least one of a plurality of users of the first data server.

3. The method of claim 1, wherein the processing circuit modifies the set of criteria indicated in the settings file in response to user input via the GUI.

4. The method of claim 1, wherein the processing circuit selects a remote server among a plurality of remote servers to use as the second data server for a particular backup operation based on the set of criteria specified in the respective settings file.

5. The method of claim 1, wherein the processing circuit displays on the GUI, a list of data files associated with a respective user account that are saved in the first data server and the second data server.

6. The method of claim 1, wherein the processing circuit selects a remote server among a plurality of remote servers to use as the second data server for storing generated user data based on the set of criteria specified in the respective settings file.

7. The method of claim 1, wherein the processing circuit responds to a user command during a voice over internet protocol (VoIP) call provided by the data communications circuitry, to or from one of the user accounts by:
   transcribing a recorded VoIP call to produce a transcription; and
   storing the transcription on the first data server.

8. The method of claim 1, further including transferring, in response to satisfaction of a set of criteria in a settings file corresponding to the user account, one or more data files from the first data server to a second data server, wherein the second data server is remote to the communications server.

9. The method of claim 1, further including maintaining a first index of data files stored on the first data server and a second index of data files copied to the second data server.

10. The method of claim 9, further including using an indication of satisfaction of a set of criteria associated with a settings file which corresponds to the user account, and based on the set of criteria, using the communications server to store all data files associated with a user on the second data server.

11. The method of claim 9, further including using an indication of satisfaction of a set of criteria associated with a settings file which corresponds to the user account, and based on the set of criteria, wherein the set of criteria is used to direct the communications server to store a subset of data files associated with a user on the second data server.

12. The method of claim 11, wherein the set of criteria is used to direct the communications server to log into the second data server using login credentials included in the settings file.

13. The method of claim 9, further including using an indication of satisfaction of a set of criteria associated with a settings file which corresponds to the user account, and based on the set of criteria, wherein the set of criteria is used to direct the communications server to store a subset of data files associated with a user on the second data server, and wherein the set of criteria specify that the subset of data files to be stored on the second data server are selected based on a type of the data files.

14. The method of claim 9, further including using an indication of satisfaction of a set of criteria associated with a settings file which corresponds to the user account, and based on the set of criteria, wherein the set of criteria is used to direct the communications server to store a subset of data files associated with a user on the second data server, and wherein the set of criteria specify that the subset of data files to be stored on the second data server are selected based on a size of the data files.

15. The method of claim 9, further including using an indication of satisfaction of a set of criteria associated with a settings file which corresponds to the user account, and based on the set of criteria, wherein the set of criteria direct the communications server to store a subset of data files associated with a user on the second data server, and wherein the set of criteria specify that the subset of data files to be stored on the second data server are selected based on a date of creation of the data files.

16. The method of claim 9, further including using an indication of satisfaction of a set of criteria associated with a settings file which corresponds to the user account, and based on the set of criteria, wherein the set of criteria direct the communications server to store a subset of data files associated with a user on the second data server, and wherein the set of criteria specify that the subset of data files to be stored on the second data server are selected based on available storage of at least one of the first data server and the second data server.

17. The method of claim 9, further including using an indication of satisfaction of a set of criteria associated with a settings file which corresponds to the user account, and based on the set of criteria, wherein the set of criteria direct the communications server to transfer data files to the second data server in response to a total amount of data stored on the first data server for the user account exceeding a threshold data size.

18. The method of claim 9, further including using an indication of satisfaction of a set of criteria associated with a settings file which corresponds to the user account, and based on the set of criteria, further including storing a copy of the one or more data files on the second data server, in response to the set of criteria indicating that the one or more data files are to be backed up.

19. The method of claim 9, further including using an indication of satisfaction of a set of criteria associated with a settings file which corresponds to the user account, and based on the set of criteria, wherein the set of criteria is used to direct the communications server to store a copy of the one or more data files on a plurality of remote data servers, and to store a copy of the one or more data files on a particular remote data server among the plurality of remote data servers based on a transfer speed to the particular remote data server.

\* \* \* \* \*